F. TABER.
CHAIN GRATE.
APPLICATION FILED OCT. 10, 1908.
919,088.
Patented Apr. 20, 1909.
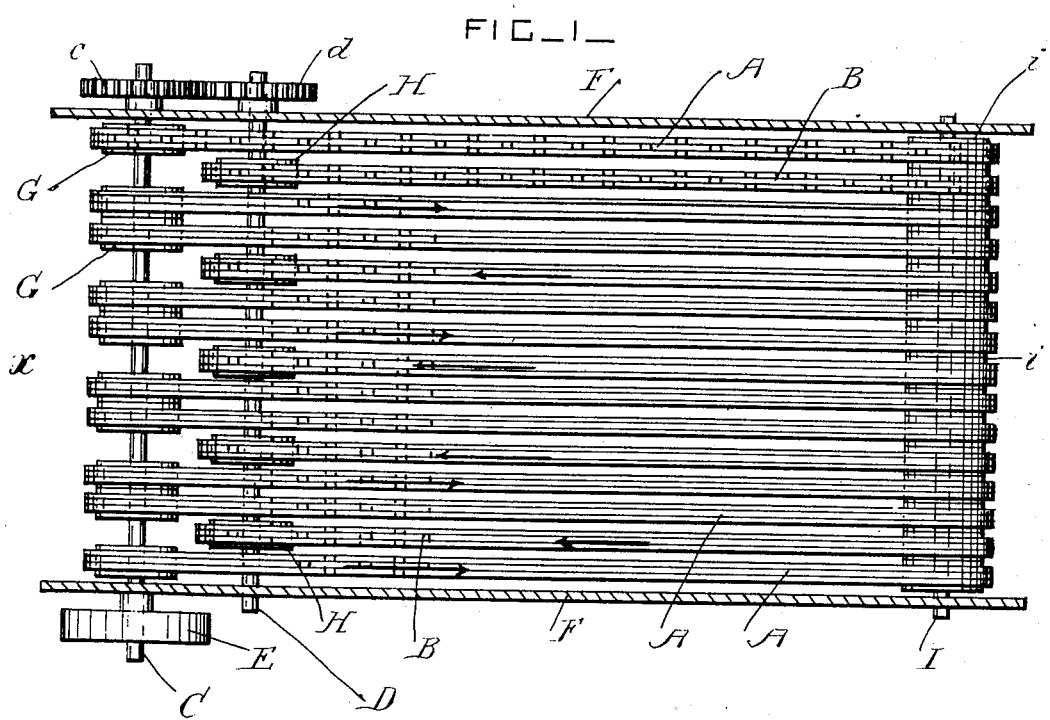
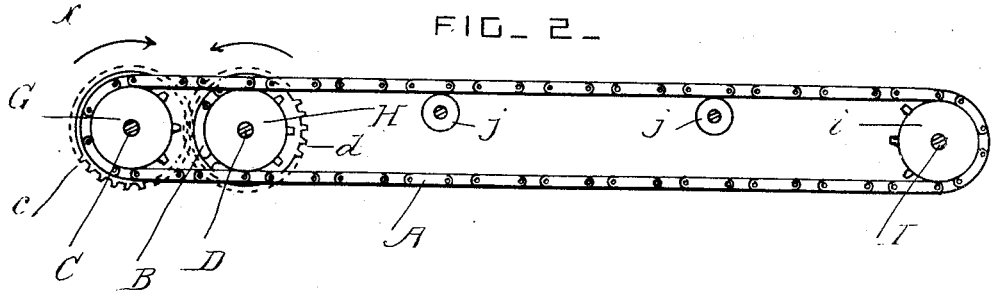
WITNESSES:
INVENTOR
Frank Taber
BY

UNITED STATES PATENT OFFICE.

FRANK TABER, OF ELVINS, MISSOURI.

CHAIN GRATE.

No. 919,088.     Specification of Letters Patent.     Patented April 20, 1909.

Application filed October 10, 1908. Serial No. 457,111.

*To all whom it may concern:*

Be it known that I, FRANK TABER, a citizen of the United States, residing at Elvins, in the county of St. Francois and State of Missouri, have invented certain new and useful Improvements in Chain Grates; and I do hereby declare the following to be a full, clear, and exact description of the invention, such as will enable others skilled in the art to which it appertains to make and use the same.

This invention relates to chain-grates for steam-boiler furnaces; and it consists in the novel construction and combination of the parts hereinafter fully described and claimed.

In the drawings, Figure 1 is a plan view of a chain-grate constructed according to this invention, and showing a portion of the furnace. Fig. 2 is a longitudinal section through the chain-grate.

The grate is provided with two series of endless chains A and B, each of which is constructed of links of any approved form coupled together by pivot pins.

C and D are two driving-shafts journaled in suitable bearings at one end of the grate, and arranged at a short distance apart. These two shafts are operatively connected together by any approved driving wheels or devices $c$ and $d$, so that they are constrained to revolve in opposite directions, and one of these shafts is provided with a driving-wheel E which is driven from any approved engine or motor.

F are the side portions of the furnace between which this chain-grate works.

The shaft C is provided with a series of driving-wheels G which engage with the chains A; and the shaft D is provided with a series of driving-wheels H which engage with the chains B.

I is a shaft arranged at the other end of the chain-grate from the shafts C and D, and $i$ are guide-wheels journaled loosely on the shaft I and engaging with all the chains A and B.

Intermediate guide wheels $j$ of approved construction may be used to support the middle parts of the grate, and as many of them as desirable may be provided.

The directions of motion of the chains is indicated by the arrows in Fig. 1. The upper stretches of the series of chains A are moved from the front to the rear, while the upper stretches of the series of chains B are moved from the rear to the front in the opposite direction from the upper stretches of the series of chains A. When the end $x$ is the front end of the grate upon which the fuel is placed, certain of the chains A which move from front to rear are preferably placed next to the side portions F, to move the fuel to the rear against the resistance of the parts F. Certain other of the chains A are arranged between certain of the chains B, which move in the reverse direction, at the intermediate parts of the grate. As many of each of the chains A and B as desired can be used, and they are arranged in any desired proportion so as to cause the fuel to travel from the front to the rear of the grate at any slow speed desired. As part of the chains move in one direction and part in the other direction, the fuel is kept stirred up and is prevented from caking. The peculiar oscillating motion imparted to the fuel while traveling as a whole slowly toward the rear, permits the air to penetrate the mass of the fuel in every direction, and a very effective and thorough combustion is thereby assured.

The chains A and B are shown adapted to travel at the same rate of speed, the wheels $c$ and $d$ being of equal size. If desired however the chains can be run at different speeds by varying the sizes of the wheels $c$ and $d$.

What I claim is:

1. A chain grate comprising two series of endless chains arranged in vertical planes and parallel to each other, the chains of one series being arranged at intervals between the chains of the other series, and driving wheels arranged to revolve in vertical planes and operating to move the upper stretches of one series of chains in one direction and operating to move the upper stretches of the other series of chains in the opposite direction.

2. A chain grate comprising two series of endless chains arranged in vertical planes and parallel to each other, the chains of one series being arranged at intervals between the chains of the other series, two driving shafts journaled at one end portion of the grate, driving mechanisms for revolving the said driving shafts in opposite directions, and driving wheels secured on the said driving shafts and arranged to revolve in vertical planes and operating to move the upper stretches of one series of chains in one direction and operating to move the upper stretches of the other series of chains in the opposite direction.

In testimony whereof I have affixed my signature in the presence of two witnesses.

FRANK TABER.

Witnesses:
  W. C. REECE,
  CLEVE ROSS.